United States Patent Office 3,474,022
Patented Oct. 21, 1969

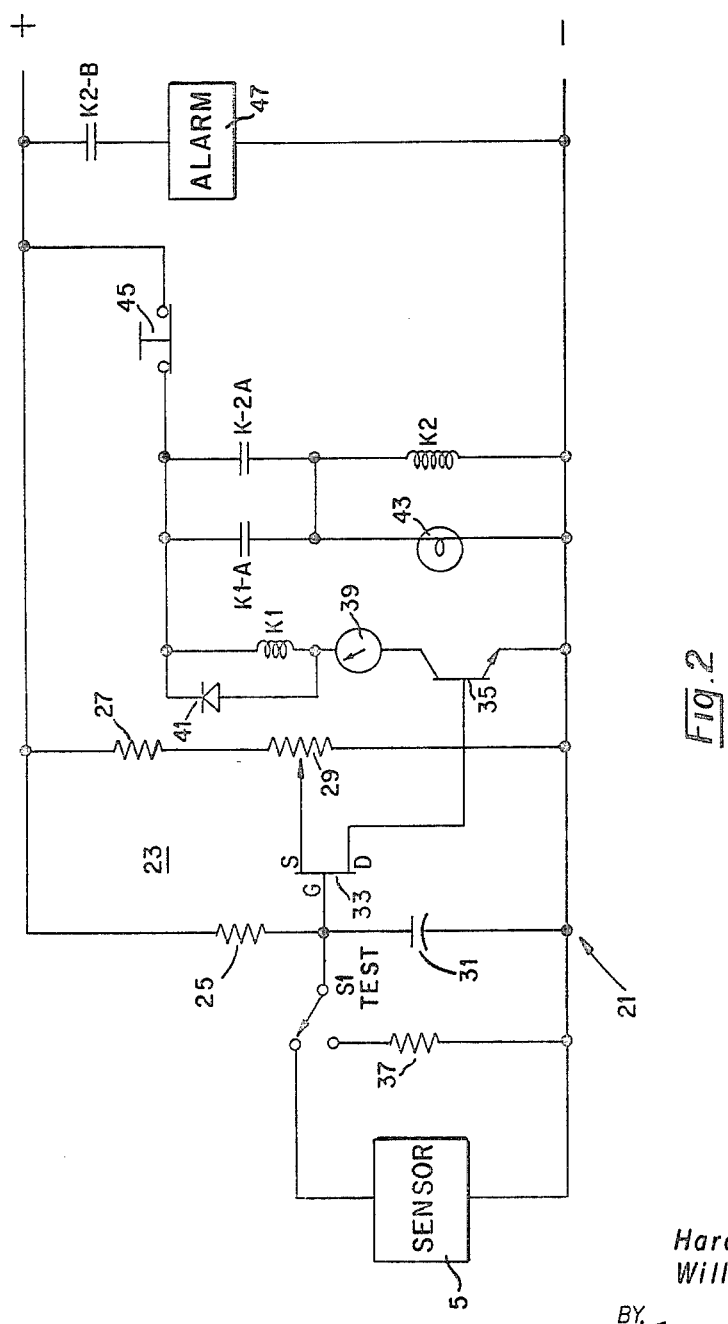

3,474,022
ALARM SYSTEM FOR UF$_6$ IN AIR
Harold D. Culpepper and William O. Gentry, Oak Ridge, Tenn., assignors to the United States of America as represented by the United States Atomic Energy Commission
Filed Sept. 14, 1967, Ser. No. 668,311
Int. Cl. B01k 3/04
U.S. Cl. 204—195                                    6 Claims

ABSTRACT OF THE DISCLOSURE

A system for giving warning of the release of gaseous UF$_6$ into an air atmosphere has been developed. The system includes a specially designed heat and vibration-resistant sensor whose electrical resistance decreases markedly if the sensor is exposed to UF$_6$-containing air. Alarm instrumentation remote from the sensor is actuated by a decrease in the sensor resistance.

Background of the invention

This invention was made in the course of, or under, a contract with the United States Atomic Energy Commission.

This invention relates generally to instrumentation which responds rapidly to the presence of gaseous UF$_6$ in a normally UF$_6$-free atmosphere. More particularly, it relates to instrumentation for immediately signalling the release to atmosphere of gaseous UF$_6$ normally contained in piping, cylinders, pumps, or the like.

Although there are various instruments in the known prior art which will readily detect about 1000 p.p.m. of UF$_6$ in the atmosphere, the present invention has been provided to overcome some of the disadvantages of these prior art devices and is uniquely well suited to various uses. For example, when monitoring comparatively inaccessible process equipment in a gaseous diffusion cascade, the present invention eliminates the need for a complex of gas lines to convey samples of the monitored atmosphere to a UF$_6$-responsive instrument which, because of the hostile environment, must be remote from the sensor. Such gas lines are difficult to install and very expensive. Furthermore, if the gas to be detected is corrosive or radioactive, the occurrence of a single gas release may contaminate the gas lines to the extent that they cannot be reused for reliable monitoring. For this and other reasons, the invention is superior in many applications to filter-type air monitors, air radiation monitors, electrolytic conductivity detectors, smoke detectors, and the like. Since the present detector deects UF$_6$ in air and not radiation, it can be placed in a contaminated area when it is necessary to resume operation after a leak has been repaired before the area has been completely cleaned out.

This invention comprises a sensor and circuit means connected to respond to a change in the electrical resistance of the sensor, said sensor including an electrically non-conductive base, at least two spaced electrodes mounted thereon, and an active organic sensing element bridging said electrodes, said sensing element normally having a high electrical resistance but undergoing a marked reduction in resistance when contacted with air which has been exposed to gaseous UF$_6$.

Accordingly, it is an object of this invention to provide a UF$_6$ in air detector which permits the monitoring of a region of interest, for example, the atmosphere immediately adjacent to a selected piece of process equipment, without requiring transport of samples of the atmosphere to some remote location for analysis.

Another object of this invention is to provide a UF$_6$ sensor which remains stable and sensitive when subjected for a considerable period to the vibration and elevated temperatures common to industrial environments.

Further, it is an object of this invention to provide a UF$_6$ detection and alarm system which will give warning when the concentration of UF$_6$ in the atmosphere exceeds a predetermined threshold.

Still another object of this invention is to provide a UF$_6$ sensor which is small, lightweight, comparatively inexpensive, and can be installed in a location remote from its associated alarm circuitry.

Other objects and many of the attendant advantages of the present invention will become evident from the following descripion when taken in conjunction with the accompanying drawings.

Brief description of the drawings

FIGURE 2 is a schematic diagram of the sensor and associated alarm circuitry.

Description of the preferred embodiments

Figure 1:
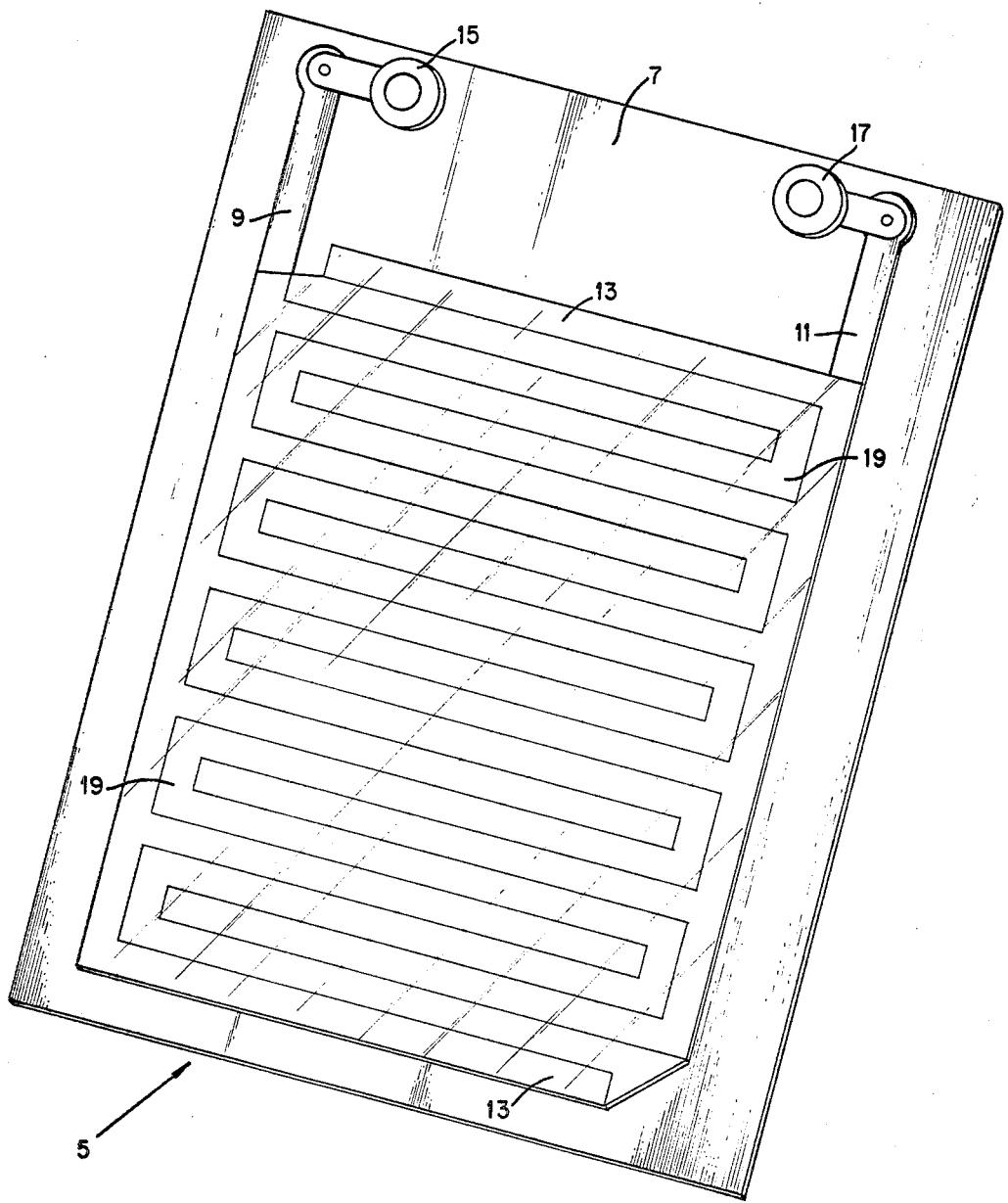
FIGURE 1 is a pictorial view of a UF$_6$ sensor according to the present invention.

The subject invention will be illustrated herein in terms of an embodiment conceived for use as an electrically operated "UF$_6$ out-leakage detector" which gives warning when the concentration of UF$_6$ in the atmosphere into which the sensor is placed exceeds about 1000 p.p.m.

Referring now to FIGURE 1, the sensor 5 includes a fiberglass base or substrate 7. The face of the substrate carries two spaced electrically conductive strips, or electrodes 9 and 11. The electrodes, which may be formed by standard printed circuit techniques, are composed of gold plated copper and are exposed to the atmosphere. As shown, the electrodes are formed with spaced extensions 13, the extension of one electrode being arranged in space, interleaving relationship with those of the other. The electrodes 9 and 11 are provided with terminals 15 and 17, respectively, for connection to a control unit which will be discussed later. Electrodes 9 and 11 are interleaved to conserve space while providing the necessary surface area of electrode to provide a predetermined threshold detection level.

The substrate-and-electrode assembly is sensitized by the application of an active organic coating 19 which bridges the interleaved extensions 13 of the electrodes 9 and 11. In the embodiment shown, the coating 19 comprises an organic paste which consists of a mixture of molybdenum disulfide powder (a conductor), polyalkylene glycol (a semiconductor) and a non-conductive base or thickening agent such as lithium soap. The paste is spread or otherwise disposed on the substrate in the form of a continuous, thin coating, and the coated substrate is stabilized at the anticipated operating temperature by baking in air at, for example, 200° F. for a period of about twenty-four hours. After baking the terminal-to-terminal resistance of the sensor typically is about 100 megohms for an interleaved electrode arrangement as shown in FIGURE 1. When the coated sensor is exposed to air containing at least 1000 p.p.m. UF$_6$, its resistance decreases rapidly to about 10% of its usual value.

Referring now to FIGURE 2, there is shown a control circuit 21 to which the sensor 5 is connected at the input thereof. The control circuit includes a resistance-sensing bridge generally indicated at 23. When the manual switch S1 is thrown to the position shown, the sensor 5 is made the measuring arm of the bridge. The bridge circuit further includes balancing resistors 25 and 27, an alarm set potentiometer 29 and a shunting capacitor 31. The input terminals of the bridge are connected between a common power supply. The alarm set potentiometer 29 is used to pre-set the bridge so that an alarm is energized if the resistance of the sensor decreases markedly. A field effect transistor 33 is connected across the output terminals of the bridge to amplify its output and apply it to the base of a second transistor 35. A relay 37 and an ammeter 39 are connected in series between the positive side of the common power supply and the collector of transistor 35 while the emitter of transistor 35 is connected to the negative side of the power supply. Relay 37 is shunted by a protecting diode 41. Relay K1 operates a standard lock-in alarm circuit consisting of a contact K1–A of relay K1 connected in series with a lamp 43 between the positive and negative sides of the power supply. A relay K2 is connected in parallel with lamp 43 and is actuated upon closing of contact K1–A and has one of its contacts K2–A connecting it to the positive side of the power supply which seals in relay K2. A manual reset switch 45 is connected in series with contact K2–A to release relay K2 once it has been sealed in. A second contact of relay K2–B is connected in series with an alarm device 47 and the series connection is connected between the positive and negative side of the common power supply.

The circuit shown in FIGURE 2 includes an arrangement for testing the overall operation of the alarm circuit for a single low-resistance value of the sensor 5. A typical circuit test will now be described to illustrate the operation of the overall system. Assume that the potentiometer 29 has been set near zero and that switch S1 has been thrown to a "test" position substituting a resistor 37 for the sensor 5. Resistor 37 is of a value approximately equal to the resistance of the sensor 5 when it has been exposed to a $UF_6$-containing atmosphere. The potentiometer 29 then is gradually turned up until the bridge output signal to transistor 35 is sufficient to increase the transistor 35 output to a value sufficient to energize relay K1. As relay K1 picks up, it closes contact K1–A, energizing relay K2. This closes contacts K2–A and K2–B, which respectively seal in relay K2 and close the circuit to the alarm device which may be a remote audible or visible alarm. The procedure just described adjusts the circuit so that it will energize the alarm if the resistance of the sensor decreases to the predetermined value of the test resistor 37. Preferably, the potentiometer 29 is precalibrated to read in terms of a series of sensor resistance values, for example, values from 2–20 megohms to facilitate selection of the sensor resistance at which the circuit will alarm when exposed to $UF_6$ in air.

The above alarm circuitry of FIGURE 2 has been described with regard to a preferred embodiment. It will be apparent that many other circuits within the skill of the art can be used to detect the decrease in the resistance of sensor 5 and then to actuate an alarm. It will also be apparent that the circuit can be designed not only to energize an alarm but to actuate various other utilization systems, for example, safety systems or process controls. A number of sensors placed in different locations may be connected in parallel to one common alarm circuit.

The above-described organic coating has been found to be thermally stable at temperatures of substantially 200° F. and sensitive to concentrations of $UF_6$ as low as 1000 p.p.m. of $UF_6$ in air with a response time of less than 30 seconds.

Although the coated sensor tends to recover part of its inital high resistance following exposure to $UF_6$ in air, it appears preferable to replace the sensor once it has been exposed. The base may be recoated for use after it has been scrubbed and degreased.

Thus, it will be seen that an alarm system for $UF_6$ in air has been provided which is especially useful in detecting concentrations as small as 1000 p.p.m. of $UF_6$ in air which is stable and sensitive when subjected for a considerable period to the vibration and elevated temperature common to industrial environments.

It will be understood that, while a preferred embodiment has been set forth above, the invention is not limited thereto and various other physical embodiments, dimensions, and characteristics can readily be made without departing from the spirit and scope of the present invention as set forth in the appended claims.

What is claimed is:

1. A detector for $UF_6$ comprising: an electrically non-conductive base member, a pair of spaced electrodes mounted on said base member, and a sensing element having a composition consisting essentially of molybdenum disulfide, polyalkylene glycol and an organic base bridging said electrode.

2. A detector for $UF_6$ which is sensitive in air at a temperature of substantially 200° F. including a sensing element comprising molybdenum disulfide, polyalkylene glycol and an organic base, and means for detecting a change in the electrical resistance of said element upon exposure to $UF_6$ in air.

3. A detector for $UF_6$ as set forth in claim 2 wherein said means for detecting a change in the electrical resistance of said element comprises a pair of electrodes between which said element is disposed, a resistance sensitive network having an input connected to said pair of electrodes and an output which is actuated upon the detection of a marked reduction of the resistance at said input, and a utilization device connected to said output of said network.

4. A detector for $UF_6$ as set forth in claim 3 wherein said pair of electrodes are mounted on a non-conductive base member, and said electrodes are predeterminately spaced apart in an interleaved array.

5. A detector for $UF_6$ as set forth in claim 4 wherein said organic base of said sensing element is lithium soap.

6. A detector for $UF_6$ are set forth in claim 5 wherein said sensing element is responsive in an air atmosphere containing at least 1000 p.p.m. of $UF_6$.

References Cited

UNITED STATES PATENTS

| 2,851,411 | 9/1958 | Bly | 204—195 |
| 3,096,258 | 7/1963 | Poulos | 204—1.1 |
| 3,336,212 | 8/1967 | Nicholas et al. | 204—195 |

OTHER REFERENCES

Seiyama et al., "Analytical Chemistry," vol. 38, No. 8, July 1966, pp. 1069–10733.

JOHN H. MACK, Primary Examiner

T. TUNG, Assistant Examiner

U.S. Cl. X.R.

23—232, 254